T. G. OELKE.

VEHICLE HUB AND AXLE.

APPLICATION FILED MAR. 30, 1912.

1,072,250. Patented Sept. 2, 1913.

Inventor

Theodore G. Oelke

Witnesses

M. H. Stifler

P. M. Smith

By Victor J. Evans

Attorney

UNITED STATES PATENT OFFICE.

THEODORE G. OELKE, OF ANADARKO, OKLAHOMA.

VEHICLE HUB AND AXLE.

1,072,250. Specification of Letters Patent. Patented Sept. 2, 1913.

Application filed March 30, 1912. Serial No. 687,492.

*To all whom it may concern:*

Be it known that I, THEODORE G. OELKE, a citizen of the United States, residing at Anadarko, in the county of Caddo and State of Oklahoma, have invented new and useful Improvements in Vehicle Hubs and Axles, of which the following is a specification.

This invention relates to vehicle hubs and axles, the object in view being to provide novel and effective means for connecting a wheel hub to its axle in such manner as to positively exclude all dust, dirt, and foreign matter, and prevent the escape of lubricant supplied to said axle spindle and skein.

A further object, incidental to the construction involved, is to strengthen the hub of the wheel, and materially increase the life and durability thereof.

With the above and other objects in view, the invention consists in the construction, combination and arrangement of parts, as will be hereinafter more fully described, illustrated in the accompanying drawings, and pointed out in the claim hereunto appended.

Figure 1:
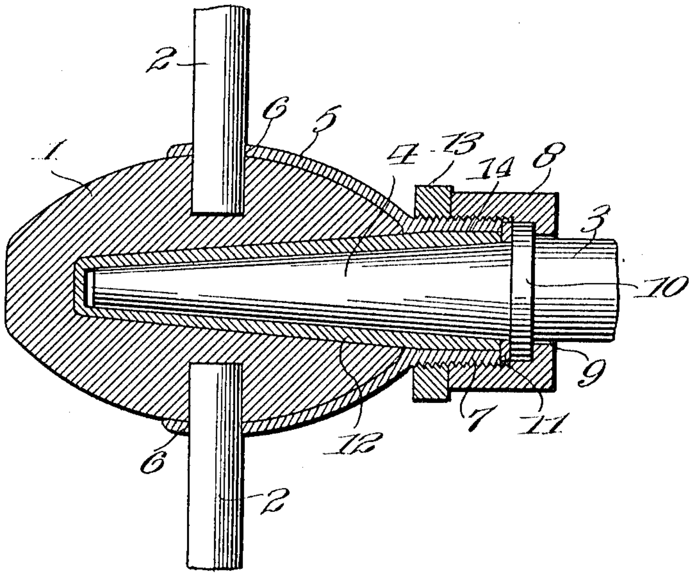
Figure 2:
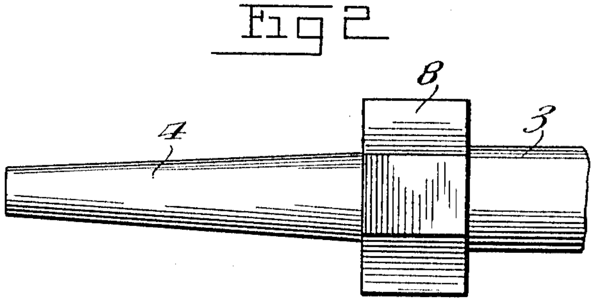

In the drawings: Figure 1 is a sectional view of a wheel hub, showing the adjacent end of an axle in proper relation thereto, and embodying the present invention. Fig. 2 is a detail view of the axle spindle and the union.

Referring to the drawings, 1 designates a wheel hub, 2 the spokes thereof, 3 the axle, and 4 the axle spindle.

In carrying out the present invention, I provide a hub, embracing an inclosing metal casing 5, as shown in Fig. 1, the said casing inclosing and covering the entire inner portion of the hub 1, and extending by preference beyond the plane of the spokes 2, said casing being provided with holes 6 which receive the spokes 2, when they are inserted into the hub, the spokes thus locking the metal casing 5 to the hub.

At the inner end, the casing is provided with a hollow cylindrical exteriorly threaded extension 7 which is adapted to receive an internally threaded union 8, mounted on the axle 3. The union 8 is formed with a central hole 9 slightly larger than the axle 3, adapting the said union to be turned around the axle, and at the junction of the spindle 4 with the main body of the axle 3, the latter is provided with an annular flange 10 forming a shoulder, against which the union 8 bears, as clearly shown in the drawings. In connection with the annular flange 10, a washer 11 of leather or any suitable compressible material may be employed, the same being adapted to be confined between the flange 10 and the end of the extension 7 to form a water and oil tight joint.

Extending into the center of the hub 1 which is closed at its outer end, as shown, is an axle box 12 which is connected at its end to the extension 7. The inner end portion of the box 12 is cylindrical and fills the bore in the hollow cylindrical extension 7 of the hub casing, said box being driven tightly into the extension with a taper fit, as shown at 14.

13 designates a lock nut adapted, when the union 8 is in its final position, to bear against the end of the union and prevent the same from working loose, thus securely locking the parts together.

From the foregoing description, it will be seen that by reason of the outer end of the hub being intact, it will positively exclude water, dust, dirt, and other foreign matter, and by reason of the particular form of connection between the axle and the inner end of the hub, such foreign matter will also be excluded at that point. Furthermore, the lubricating material for the axle spindle will be strictly confined within the hub, thus adding to the working qualities of the device as a whole. Furthermore, the metal casing 5 serves as an effective protection for the hub and prevents the drying out and cracking of the vehicle hub.

What is claimed is:

A wheel hub, comprising a one piece metal hub embracing casing formed with spoke receiving holes which register with the spoke sockets in the hub, an externally threaded tubular extension at the inner end of said casing, an axle box having a cylindrical inner end filling said extension and driven tightly into the same with a taper fit, an axle spindle having an annular shoulder, a threaded union surrounding the axle and engaging the annular shoulder thereof and also the threaded extension of the hub casing, and a lock nut on said extension bearing against the union.

In testimony whereof I affix my signature in presence of two witnesses.

THEODORE G. OELKE.

Witnesses:

OSCAR DIEHR,

A. J. HOLMES.

Copies of this patent may be obtained for five cents each, by addressing the "Commissioner of Patents. Washington, D. C."